US011931914B2

(12) United States Patent
Bergmann

(10) Patent No.: US 11,931,914 B2
(45) Date of Patent: Mar. 19, 2024

(54) SYSTEM FOR PICKING UP, CONVEYING, AND DELIVERING A PRODUCT, AND METHOD OF CONTROLLING SUCH SYSTEM

(71) Applicant: POLY-CLIP SYSTEM GMBH & CO. KG, Hattersheim (DE)

(72) Inventor: Martin Bergmann, Hösbach (DE)

(73) Assignee: POLY-CLIP SYSTEM GMBH & CO. KG, Hattersheim (DE)

( * ) Notice: Subject to any disclaimer, the term of this patent is extended or adjusted under 35 U.S.C. 154(b) by 354 days.

(21) Appl. No.: 17/416,374

(22) PCT Filed: Dec. 18, 2019

(86) PCT No.: PCT/EP2019/086082
§ 371 (c)(1),
(2) Date: Jun. 18, 2021

(87) PCT Pub. No.: WO2020/127575
PCT Pub. Date: Jun. 25, 2020

(65) Prior Publication Data
US 2022/0072730 A1 Mar. 10, 2022

(30) Foreign Application Priority Data
Dec. 19, 2018 (DE) .......................... 102018132907.5

(51) Int. Cl.
*B26D 7/06* (2006.01)
*A22C 7/00* (2006.01)
(Continued)

(52) U.S. Cl.
CPC ............ *B26D 7/0641* (2013.01); *A22C 7/003* (2013.01); *A22C 17/0093* (2013.01);
(Continued)

(58) Field of Classification Search
CPC .. Y10S 83/932; Y10T 83/0429; Y10T 83/202; Y10T 83/2192; Y10T 83/2185;
(Continued)

(56) References Cited

U.S. PATENT DOCUMENTS 5,403,056 A * 4/1995 Wallace ............. A22C 17/0093
294/98.1
6,045,071 A 4/2000 Emsens
(Continued)

FOREIGN PATENT DOCUMENTS

DE 4302082 A1 8/1994
DE 102007031847 B3 10/2008
(Continued)

OTHER PUBLICATIONS

International Search Report for PCT/EP2019/086082, dated Apr. 6, 2020, and English Translation submitted herewith (5 pages).
(Continued)

*Primary Examiner* — Phong H Nguyen
(74) *Attorney, Agent, or Firm* — Fitch, Even, Tabin & Flannery LLP

(57) ABSTRACT

The present invention relates to a system for picking up, conveying, and delivering a foodstuff product to a processing machine which preferably has an upright magazine tube, said system including: a handling device, a gripping device releasably attachable to the handling device, a transporting apparatus, and a control unit; wherein the transporting apparatus has a transporting portion on which the foodstuff product that is to be picked up by the gripping device may be positioned in a pick-up position allowing the foodstuff product to be picked up by the gripping device, and the control unit is connected at least to the handling device of the gripping device and to the transporting apparatus; wherein the control unit is configured for detecting when the
(Continued)

foodstuff product to be picked up has reached the pick-up position.

19 Claims, 12 Drawing Sheets

(51) Int. Cl.
    *A22C 17/00*     (2006.01)
    *B25J 9/00*     (2006.01)
    *B25J 11/00*     (2006.01)
    *B25J 15/02*     (2006.01)
    *B25J 15/06*     (2006.01)

(52) U.S. Cl.
    CPC .......... *B25J 9/0093* (2013.01); *B25J 11/0045* (2013.01); *B25J 15/0253* (2013.01); *B25J 15/0616* (2013.01); *B26D 7/0633* (2013.01); *B26D 7/0683* (2013.01); *B26D 2210/04* (2013.01)

(58) Field of Classification Search
    CPC ............ Y10T 83/4615; Y10T 83/4637; B26D 7/0641; B26D 7/0633; B26D 7/0683; B26D 2210/04; A22C 7/003; A22C 17/0093; B25J 9/0093; B25J 11/0045; B25J 15/0253; B25J 15/0616
    See application file for complete search history.

(56) References Cited

U.S. PATENT DOCUMENTS

| | | | |
|---|---|---|---|
| 10,369,701 B1* | 8/2019 | Diankov | B25J 15/0616 |
| 2011/0226101 A1* | 9/2011 | Volkl | B26D 1/28 |
| | | | 83/176 |
| 2012/0163953 A1* | 6/2012 | Murano | B25J 19/06 |
| | | | 414/788.1 |
| 2019/0112134 A1* | 4/2019 | Ooba | B65G 43/08 |
| 2019/0217471 A1* | 7/2019 | Romano | B25J 15/0616 |

FOREIGN PATENT DOCUMENTS

| | | |
|---|---|---|
| DE | 102009012332 A1 | 9/2010 |
| DE | 102010035657 A1 | 9/2011 |
| DE | 102012011587 A1 | 12/2013 |
| EP | 3069835 A1 | 9/2016 |
| EP | 3178742 A1 | 6/2017 |
| FR | 2754207 A1 | 4/1998 |
| SU | 185723 A1 | 11/1972 |
| SU | 369003 A1 | 2/1973 |

OTHER PUBLICATIONS

Federal Service for Intellectual Property; Application No. 2021120788; Office Action dated Feb. 4, 2022.

* cited by examiner

SYSTEM FOR PICKING UP, CONVEYING, AND DELIVERING A PRODUCT, AND METHOD OF CONTROLLING SUCH SYSTEM

CROSS-REFERENCE TO RELATED APPLICATIONS

This application is a U.S. national phase application filed under 35 U.S.C. § 371 of International Application No. PCT/EP2019/086082, filed Dec. 18, 2019, designating the United States, which claims priority from German Application No. 10 2018 132 907.5, filed Dec. 19, 2018.

FIELD OF THE INVENTION

The present invention relates to a system for picking up, conveying, and delivering a product, and to a method of controlling said system. The system includes a transporting apparatus and a gripping device, in particular a gripping device that is attached to a handling device, and is to be used for processing foodstuff.

BACKGROUND

Within the frame of the present invention, the system serves, on the one hand, for picking up, conveying, and delivering a product, and, on the other, for pressure-compacting said product into a predefined shape. For this purpose, the product is preferably picked up from a product support or transporting apparatus and is seized by the gripping device. Then, the product is transported, and delivered, to a predefined position by means of the handling device on which the gripping device is attached. In addition, the product is specifically pressure-compacted on its circumference by means of the gripping device, preferably so from above and from the sides.

For example, in order to allow a product, such as a strand of meat, to be cut into slices of approximately equal thickness and weight, it is necessary for the meat strand to be first pressure-compacted into a predefined shape in order to facilitate the cutting process within the portioning machine. For this purpose, according to DE 10 2010 035 657 A1, the meat strand is inserted into a form tube and pressure-compacted by means of a rotatable intermediate plate arranged on one end of the form tube and a displaceable pressure ram. The shape of the meat strand is defined by that of the form tube.

Since long meat strands, in particular, may have considerable weight, the acts of picking up and inserting these meat strands may be very strenuous and burdensome for an operator.

It is an object of the invention to provide a system for picking up, conveying, and delivering a product, and a method of controlling said system, which is capable of relieving the burden of an operator, of compressing the product, preferably from its lateral sides, and of shortening cycle times.

SUMMARY OF THE INVENTION

This object is accomplished, according to the present invention, by providing a system for picking up, conveying, and delivering a product, as well as a method of controlling such system, which are defined by the independent claims 1 and 15. Further developments of the invention are defined in the dependent claims.

An inventive system for picking up, conveying, and delivering a product to a processing machine which preferably has at least one upright magazine tube comprises: a handling device, a gripping device releasably attachable to the handling device, a transporting apparatus, and a control unit, the transporting apparatus having a transporting portion on which the product that is to be picked up by the gripping device may be positioned in a pick-up position allowing the product to be picked up by the gripping device, and the control unit being connected at least to the handling device of the gripping device and to the transporting apparatus, the control unit being configured for detecting when the product to be picked up has reached the pick-up position.

This system is capable of seizing or gripping a product such as foodstuff in the form of a meat strand, or other foodstuff having similar consistency such as fish or bread, and of conveying it, for example, to a processing station and, preferably, of preparing it at the same time for the subsequent processing step. It is thus possible to feed a plurality of processing stations using a single handling device, which makes it possible to save time and reduce costs. Moreover, production efficiency is enhanced by better utilising the capacity of the handling device.

In some embodiments, the system includes a first detection means which is arranged above the transporting apparatus, said first detection means being configured to detect when the product to be picked up has reached the pick-up position on the transporting apparatus. By using the first detection means, which may be provided, for example, in the form of a light barrier, a capacitive sensor, a mechanical sensor or an imaging sensor, it is possible to detect a product located in a pick-up position in which the product to be picked up is seized by the gripping device.

In some embodiments, the system includes a second detection means, with the gripping device being capable of being positioned in a delivery position, above the at least one magazine tube, ready for delivering the product which has been picked up by the gripping device to the magazine tube, and with the second detection means being configured for detecting the product positioned above the magazine tube by the gripping device. The second detection means map be provided, for example, in the form of a light barrier, a capacitive sensor, a mechanical sensor or an imaging sensor.

In some embodiments, the system includes a third detection means which is arranged above the at least one magazine tube of the processing machine, said third detection means being configured to detect a product falling into the magazine tube. The third detection means map be provided, for example, in the form of a light barrier, a capacitive sensor, a mechanical sensor or an imaging sensor.

In some embodiments, the gripping device includes a base structure which may be attached to a handling device by means of a coupling element, preferably so in a non-destructively detachable manner, at least two gripper members having each at least one bottom surface and at least one top surface, said top surfaces of the gripper members facing towards the coupling element and said bottom surfaces of the gripper members facing away from the coupling element, at least one drive means for reversibly moving the gripper members between a first position, in which the gripper members may be positioned on opposite sides of the product to be picked up, and a second position, in which the gripper members seize the product to be picked up, and an abutment plate which is at least approximately supported by the top surfaces of the gripper members.

In some embodiments, the gripper members of the gripping device are provided with concave gripping surfaces which are capable of reaching at least partially under the product to be picked up. This shaping of the gripper members may safely prevent the product from slipping down. In addition, the gripping surfaces may be used to contribute to the shaping of the product.

The abutment plate may be realised, on at least a side facing the gripper members, in particular the bottom side, in an essentially flat and/or planar manner. The abutment plate is intended to prevent the product to be picked up by the gripper members from slipping away laterally upwards while the product is being seized by the gripper members. The abutment plate may be supported by the top surfaces of the gripper members both in the first and in the second position. The abutment plate may be dimensioned in such a manner and/or one dimension of the abutment plate may be adapted to a distance of the gripper members with respect to each other or to an movement amplitude of said gripper members, such that the abutment plate is supported by the top surfaces of the gripper members both in the first and in the second position.

The gripper members may, for example, have a cup-like shape and/or may be concavely curved. Furthermore, the top surfaces and the bottom surfaces of the gripper members may be integrally formed from a single piece of material. The gripper members may be configured and/or dimensioned in such a manner that they reach only partially under the picked-up product, thus ensuring continuous contact between the product and the product support. In total, the gripper members may, for example, reach under less than 90%, less than 80%, less than 70%, less than 60% or less than 50% of the product.

In an exemplary embodiment, a motor such as a servomotor, a stepper motor, an asynchronous motor and/or a direct current motor may be coupled to the gripper members in order to control their movements, to adjust a compressive force applicable to the product that is to be pressure-compacted, and/or to convey the product that has been picked up and optionally pressure-compacted by the grippers to a desired station for further processing such as a meat portioning machine. The motor may be configured for providing a compressive force of at least 100 N, at least 500 N, at least 1000 N, at least 1500 N, at least 2000 N, at least 2500 N or at least 3000 N.

The motor permits to flexibly react to different product dimensions, thus enabling the gripping device according to the invention to seize and handle products of different dimensions and/or consistencies. The utilisation of the motor has proven particularly advantageous with respect to the handling of raw products which need to be seized and further processed in a frozen condition or which have at least started to freeze. On the one hand, the products to be handled have a high weight, and on the other, a considerable force is needed for pressure-compacting the frozen product, or the product that has started to freeze, into a desired shape, which force may be readily provided and/or adjusted by means of the motor. Basically, raw products in a non-frozen condition, or products that have not yet started to freeze, may also undergo further processing.

According to a further exemplary embodiment, the product is seized and subsequently compressed by the following steps: lowering the support plate onto the product to be picked up and compressed in a translatory, vertical manner; moving the gripper members toward each other in a translatory, horizontal manner so as to form a reception space between the lateral gripper members, the abutment plate arranged vertically at the top and, optionally, the product support arranged vertically at the bottom such as a feeding appliance which may be realised, for example, in the form of a conveyor belt or transport belt; exerting a desired pressure or a desired compressive force on the picked-up product by means of the gripper members, the application of the retention force being realised and/or adjusted by means of a motor such as a servomotor, a stepper motor, an asynchronous motor and/or a direct current motor. During this process, the abutment plate may remain stationary and may be operable to prevent the product from slipping away in an upward direction.

In an exemplary embodiment, the support plate is rested on the top surfaces of the gripper members in each of the operating positions of the gripper members. In other words, a horizontal translatory movement amplitude of the gripper members is adjusted in such a manner that the abutment plate will always rest on the top surfaces of the gripper members.

In some embodiments, at least one of the gripper members is translatorily and/or rotatorily movable with respect to the base structure. Due to the translatorily and/or rotatorily movable gripper members, it is possible to pick up products at points that are not easily accessible since the width of the gripping device can be reduced. This may be realised, for example, by means of rotatorily supported gripper members which may be reversibly opened and closed in a scissor-like manner, necessitating a small gripper opening width in order to seize the product.

In some embodiments, the gripper members are fastened to the gripping device by fastening means that may be detached without tools. This makes it possible for the gripper members to be quickly exchanged, allowing to adapt the gripper members to any specific type of product and to the desired shaping of the latter.

In some embodiments, at least one suction element is arranged on the abutment plate which lifts the product to be picked up at least partially during a suction process. During this process, the suction element serves for sucking the product away from a product support surface which may be a conveyor belt conveying the product to the gripping device. Thus, the gripper members need not be applied onto the product support in order to precisely seize the product.

In some embodiments, the suction element is embedded or integrated into the abutment plate in such a manner that it forms an at least approximately even surface with the abutment plate during the suction process. This specific arrangement of the suction element ensures that the product will not be undesirably deformed by the suction element.

In some embodiments, each of the gripper members is guided by at least two guide rods. This enhances the stability of the gripper members and prevents a rotatory movement about one of the guide rods and/or reduces the forces required to prevent such rotation.

In some embodiments, the gripper members of the gripping device are capable of pressure-compacting the product into a predefined shape. Pressure-compacting the product is often required in order to be able to insert it into an element referred to as a shaped tube or magazine tube. Since the processes of conveying and pressure-compacting may occur in one processing step, this permits to save time and additional components on the station for further processing.

In some embodiments the abutment plate has a detection means arranged thereon which is capable of detecting the presence of the product. Product detection serves for detecting when the product is located between the gripper members, which enables the product to be seized in a precise and time-controlled manner.

In some embodiments, the transporting apparatus has an endless conveyor including at least two deflection pulleys and an endless conveyor belt, with the product to be picked up by the gripping device being conveyed on a product-conveying portion of said transport belt in a given direction of movement. The transport belt is operable to move the product to be picked up within the reach of the handling device.

According to an inventive method of controlling a system, said method includes the steps of: detecting the product to be picked up from a product support of the transporting apparatus, positioning the gripper members of the gripping device in a first position in which the gripper members are positioned on opposite sides of the product to be picked up, seizing the product to be picked up by reversibly moving at least one of the gripper members in the direction of the product until it has reached a second position, compressing the product, with the product being compressed into a predefined shape by means of the gripper members and the abutment plate and, optionally, the product support, moving the gripping device and product to a predefined position, and delivering the product to a magazine tube of a processing machine. When in the predefined position, the product is preferably placed vertically with respect to the magazine tube of the processing machine, so that it may be readily delivered to said magazine tube.

According to another method, the product placed on the product support of the transport belt is pressure-compacted into a predefined shape by means of the gripper members, the abutment plate, and the product support.

According to a further method, the product is pressure-compacted into a predefined shape by means of the gripper members and the abutment plate while in the process of being conveyed.

According to a further method, a second detection means is provided, which detects the presence of the product within the gripping device while the latter is in its predefined position above the magazine tube.

According to a further method, a third detection means is provided, which detects an ejection time, said ejection time corresponding to a period of time that begins essentially with the delivery of the product to the magazine tube by the gripping device, and ends as soon as the placement of the product within the magazine tube has essentially been accomplished.

According to a further embodiment, a lifter may be arranged below a product support and/or a transport belt, said lifter being capable of lifting the product to be picked up and the product support and/or the transport belt. The lifting of the product support and/or the transport belt serves for preventing the latter from being damaged or inadvertently gripped when the product is being seized by the gripping device. The lifter thus increases the service lifetime of the product support and/or the transport belt since the gripping device has essentially no contact with the latter. Such a configuration may be utilised independently from the gripping device described above.

According to a further aspect of the present invention, a system is provided which is configured for filling a foodstuff processing machine, such as a portioning machine, which has at least one magazine tube.

The system comprises a foodstuff portioning machine which has at least one magazine tube. The magazine tube may preferably be disposed in an upright manner. Portioning machines are typically used to cut strand-like foodstuff articles such as meat, fish, poultry or sausage products, or bakery products into slices of equal thickness and/or weight which are subsequently packaged as individual portions or packaged into portions containing several slices. Portioning machines may be employed for dividing a strand-like product into individual portions.

The system further comprises a transporting apparatus for conveying the foodstuff product. The transporting apparatus may be, for example, and endless transport belt or an endless conveyor belt. The foodstuff products are fed in an essentially horizontal manner by means of the transporting apparatus. The conveying direction of the transporting apparatus corresponds essentially to the orientation of the strand-like foodstuff product on the transporting apparatus.

A gripping device is configured for picking up or lifting the foodstuff product from the transporting apparatus and delivering it to the foodstuff processing machine. In an exemplary embodiment, the foodstuff product is delivered to the magazine tube. For example, the magazine tube may be essentially columnar and/or may have a cylindrical cross-section and may be provided with passage chutes for passing the foodstuff product therethrough. Typically, the magazine tube is vertically oriented, such that the passage chutes are also vertically oriented. Strictly speaking, it is also conceivable to arrange the magazine tube at an acute angle relative to the vertical direction or axis of the foodstuff processing machine. In a further exemplary embodiment, the foodstuff product is ejected into the magazine tube. The ejection of the foodstuff product into the magazine tube may be effected essentially by virtue of its mere weight force and/or without any additional aids.

Furthermore, the system incorporates a handling device on which the gripping device may be detachably fastened. The handling device may, for example, be an articulated robot, a six-axis robot, a portal robot, a Scara robot, a parallel robot, or a crane, with a robot representing generally a manipulator, which is a universal, programmable machine for manipulating and processing workpieces or the like. The handling device serves for handling the gripping device. In an exemplary embodiment, the handling device is used for transporting the foodstuff product which has been fed by the transporting device to the magazine tube of the portioning machine. The handling device may be capable of enabling the gripping device to seize and pre-compress the foodstuff product which is fed in a basically horizontal orientation.

The foodstuff product is pressure-compacted to a predefined cross-section, such that it may subsequently be delivered to the magazine tube of the portioning machine. Therefore, said predefined cross-section will preferably be smaller than the cross-section of the magazine tube of the portioning machine. The handling device may be capable of enabling the gripping device to pivot the foodstuff product in such a manner during the transport from the transporting device to the magazine tube that it may be brought into a suitable position in which the foodstuff product may be delivered to the magazine tube. For example, as the foodstuff product is transported from the transporting device to the magazine tube, it may be rotated with respect to the magazine tube in such a manner that it is positioned vertically above the magazine tube and may be delivered to, or ejected into, the magazine tube.

In addition, a control unit is provided. The control unit may be configured to control the operation of the system.

The transporting apparatus further has a transporting portion on which the foodstuff product to be picked up by the gripping device may be positioned in a pick-up position so that the foodstuff product may be picked up by the gripping device.

According to the present invention, the control unit is connected at least to the handling device, the gripping device and the transporting apparatus. For example, the control unit is connected, in terms of signal transmission or signal control, to the handling device, the gripping device, and the transporting apparatus. This means that the control unit is capable of controlling the operation of the individual components of the system according to the invention. According to an exemplary further development, the individual components may be activated independently of one another, thus allowing the system to work in a particularly efficient manner. Furthermore, the control unit is configured to detect when the foodstuff product to be picked up has reached the pick-up position. For example, when the foodstuff product has reached the pick-up position, this may become a kind of trigger or initiator for specific processing operations to be activated.

The basic concept of the present invention consists, among other things, in feeding a strand-like foodstuff product which is being conveyed in an essentially horizontal direction by means of the transporting device to a portioning machine for further processing such as pressure-compacting and subsequent portioning. In doing so, the strand-like product needs to be rotated in such a manner that it may be ejected into the magazine tube of the portioning machine. This is realised, according to the invention, in a particularly efficient manner by the fact that a control unit is connected to all of the components in order to control their operation independently of each other.

DETAILED DESCRIPTION

Figure 1:
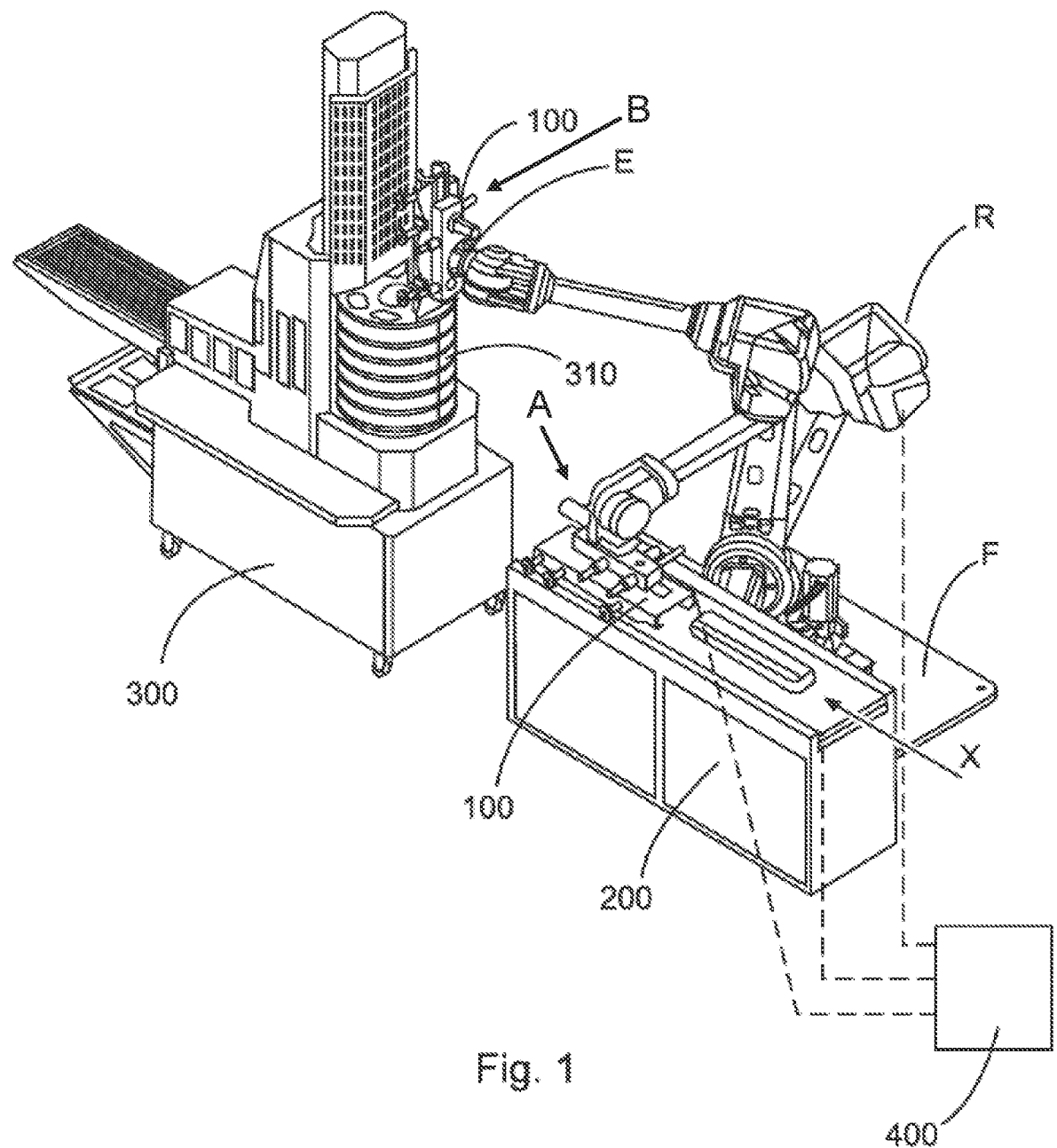
FIG. 1 shows a perspective view of a system, said system consisting of a handling device, a gripping device removably attachable to the handling device, a transporting apparatus, and a processing machine according to one embodiment of the present invention.

FIG. 1 shows a perspective overall view of a system consisting of a handling device R, a gripping device 100 removably attachable to the handling device R, a transporting apparatus 200, and a processing machine 300.

Figure 2:
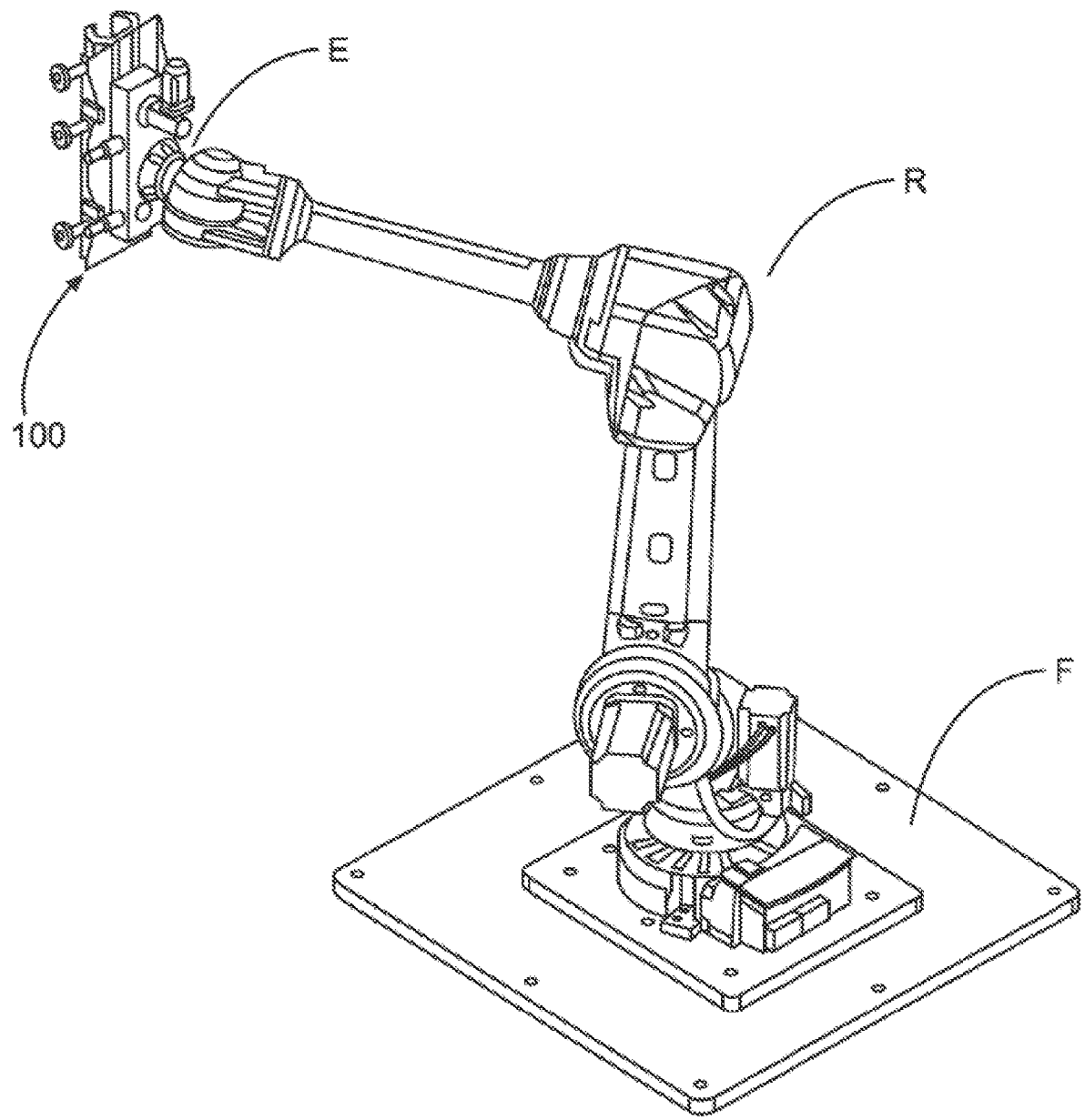
FIG. 2 shows a perspective view of the handling device shown in FIG. 1 on which the gripping device is attached.

FIG. 2 shows a perspective overall view of a handling device R which is an articulated robot or a six-axis robot. A robot is a manipulator which, in turn, may be defined as a universal, programmable machine for the handling, assembling or processing of workpieces or the like. However, the handling device R might be any other device that is capable of picking up, conveying, and delivering a product. A portal robot, a Scara robot, a parallel robot or a crane, for example, might be conceived a an alternative.

The robot R is supported by one or several foundation plates F, with the robot R and the foundation plates F being anchored in the ground, preferably using fastening means such as screws. The foundation plates F transfer the forces created during the operation of the robot R over a large area into the ground. The term ground is to be understood as suitable foundations capable of absorbing the forces of the robot R, of attenuating them and of transmitting them over a large area into the soil.

At the free end of the robot arm, that is not otherwise specified, an end flange E is provided which serves for detachably fastening an inventive gripping device 100 as described hereinafter in connection with FIGS. 3 to 8.

Control of the robot R, the gripping device 100, and the transporting apparatus 200 is preferably effected via a control unit 400 that is connected to the robot R, the gripping device 100, and the transporting apparatus 200. The control unit 400 is capable of controlling the robot R a well as the gripping device 100 and the transporting apparatus 200 independently of one another.

The control unit 400 is connected at least to the handling device R, the gripping device 100, and the transporting apparatus 200. For example, the control unit 400 is connected, in terms of signal transmission or signal control, to the handling device R, the gripping device 100, and the transporting apparatus 200. This means that the control unit 400 is capable of controlling the operation of the individual components of the system according to the invention. The individual components may be activated independently of one another, thus allowing the system to work in a particularly efficient manner. Furthermore, the control unit 400 can detect when the foodstuff product to be picked up has reached the pick-up position A. For example, when the foodstuff product has reached the pick-up position A, this may become a kind of trigger or initiator for specific processing operations to be activated.

Preferably, the robot R, the gripping device 100, the transporting apparatus 200 and the control unit 400 are all powered by at least one external power supply.

The articulated robot R is capable of performing both translatory and rotatory movements and is thus freely movable in space. In addition, the gripping device 100, which is fastened to the robot R, may be activated independently of said robot R, which makes it possible for the robot R and the gripping device 100 to be activated simultaneously. This is to say that the gripping device 100 may be opened and closed while the robot R is being moved, thus enabling the product P to be pressure-compacted into a predefined shape. For example, the product is pressure-compacted to a predefined cross-section, such that it may subsequently be delivered to the form tube or magazine tube 310 of the portioning machine 300. Therefore, said predefined cross-section will preferably be smaller than the cross-section of the opening of the form tube or magazine tube 310 of the portioning machine 300.

In addition, FIG. 1 shows a transporting apparatus 200 which is arranged at least partially within reach of the gripping device 100 of the robot R. In the present embodiment, the transporting apparatus 200 is an endless conveyor 200 or a conveyor belt 200.

In the present embodiment, the endless conveyor 200 is arranged directly in front of the robot R and consists essentially of a housing, at least two deflection pulleys 220, a drive mechanism (not shown) and an endless conveyor belt 240.

The housing of the conveyor belt 200 consists essentially of a cuboidal housing. The cuboidal housing has a bottom surface facing toward the ground and a parallel, opposite top surface. The bottom surface of the housing has four stands provided each on one of its corners. The stands are height-adjustable and serve for balancing the conveyor belt 200.

The housing and the stands consist of, for example, stainless steel or of some other type of material suitable for contact with foodstuffs. Furthermore, the housing and the stands may have a coating that protects the material and/or ensures suitability for contact with foodstuffs.

The deflection pulleys 220 and the endless conveyor belt 240 are arranged on the top surface of the housing. Two deflection pulleys 220 are rotatably supported on opposite ends of the top surface of the housing, with the endless conveyor belt 240 being arranged in such a manner that the deflection pulleys 220 are placed within the endless conveyor belt 240 and the endless conveyor belt 240 being applied tightly on the deflection pulleys 220, such that it is possible to transmit forces between the endless conveyor belt 240 and the deflection pulleys 220.

In the present embodiment, the drive mechanism of the conveyor belt 200 is arranged within the housing, with the drive mechanism being capable of driving the endless conveyor belt 240 by driving at least one of the deflection pulleys 220. The drive mechanism may be, for example, an electric drive and may be realised, for example, in the form of a magnetic drive. In a further embodiment, the drive mechanism of the conveyor belt 200 drives the endless conveyor belt 240 and the deflection pulleys 220 are not driven. In addition, the drive mechanism, or parts of the drive mechanism, may be arranged between the deflection pulleys 220, which makes it possible to save space.

The endless conveyor 200 serves for transporting the product P within the operating range of the robot R. On a product-conveying portion of the endless conveyor belt 240 which serves as product support PA, the product to be picked up by the gripping device 100 is conveyed in a direction of movement X pointing to the operating range of the robot R. By means of the endless conveyor 200, the product P to be picked up is transported to a pick-up position A in which the robot R picks up the product P.

Furthermore, FIG. 1 shows a processing machine 300, which is provided, in the present embodiment, as a portioning machine 300. The portioning machine 300 is arranged in such a manner that the robot R is capable of ejecting the product P into an upright magazine tube or form tube 310 of the portioning machine 300. However, the magazine tube or form tube 310 does not necessarily need to be arranged in an upright manner. It may also be arranged, for example, in an acute angle with respect to the central axis or vertical of the form tube segments containing said magazine tube or form tube 310.

An upright magazine tube 310 is to be understood as also including a magazine tube 310 which is at least sufficiently inclined to make it possible for the product P, once the product P has been delivered by the gripping device 100, to fall into the magazine tube 310 without any additional aids.

For example, the magazine tube 310 may be essentially columnar and/or may have a cylindrical cross-section and may be provided, for example, with oval passage chutes for passing the foodstuff product therethrough. Typically, the magazine tube is vertically oriented, such that the passage chutes are also vertically oriented. As mentioned above, the passage chutes may alternatively have some degree of inclination with respect to the vertical axis of the portioning machine 300.

The portioning machine 300 has a delivery position B at which the product P is to be delivered, said delivery position B being located directly above a magazine tube 310. The magazine tube 310 serves for conveying the product P towards a portioning unit of the portioning machine 300 which portions the product P.

The disposition of the robot R on which the gripping device 100 is attached, of the transporting apparatus 200, and of the processing machine 300 may be freely adapted, as needed. The disposition must be selected at least in such a manner that the gripping device 100 that is attached to the robot R is capable of picking up the product P to be grasped from the transporting apparatus 200 and of ejecting it into the magazine tube or form tube 310 of the portioning machine 300.

Figure 3:
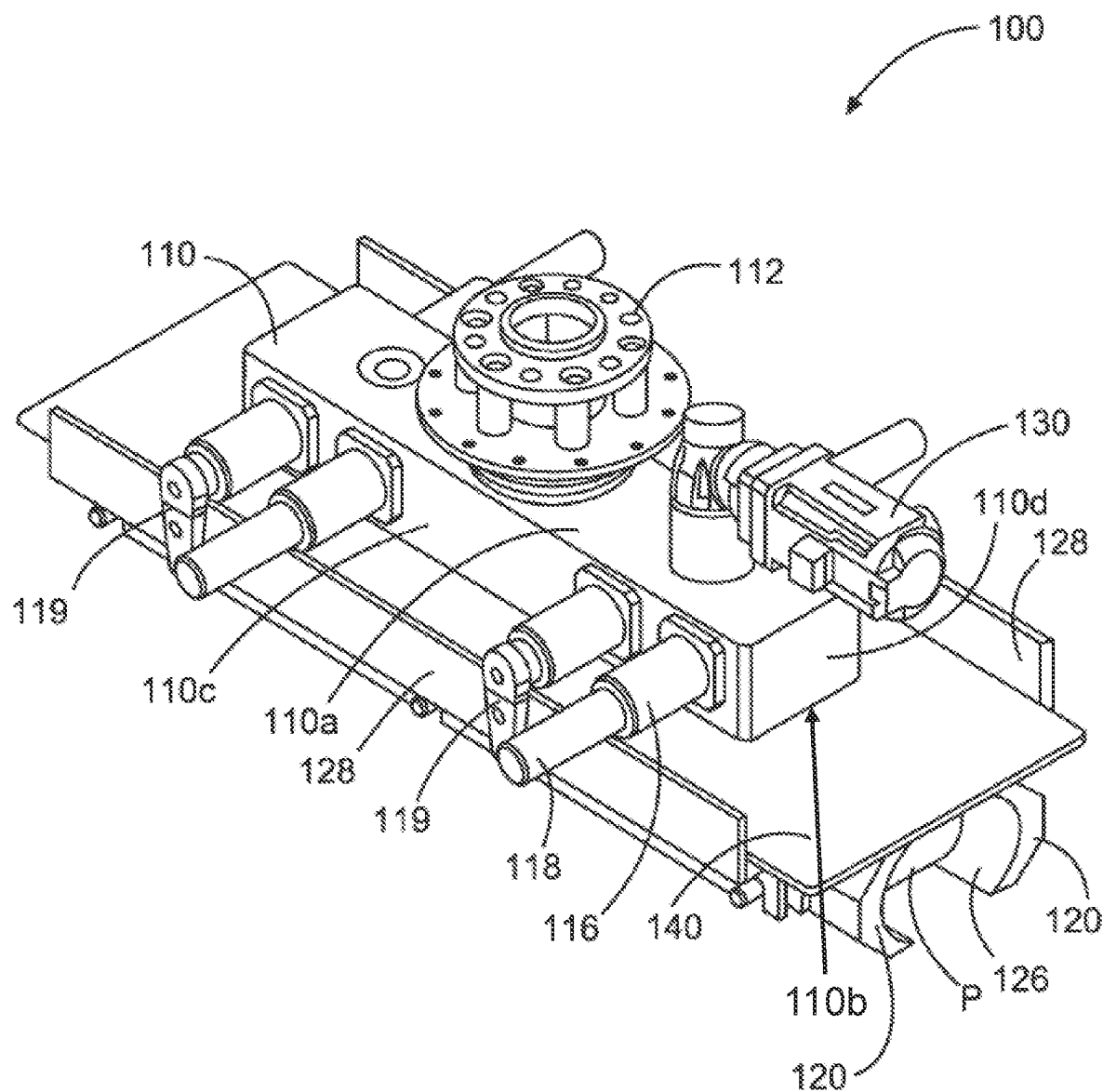
FIG. 3 shows a perspective view of the gripping device shown in FIG. 1.
Figure 4:
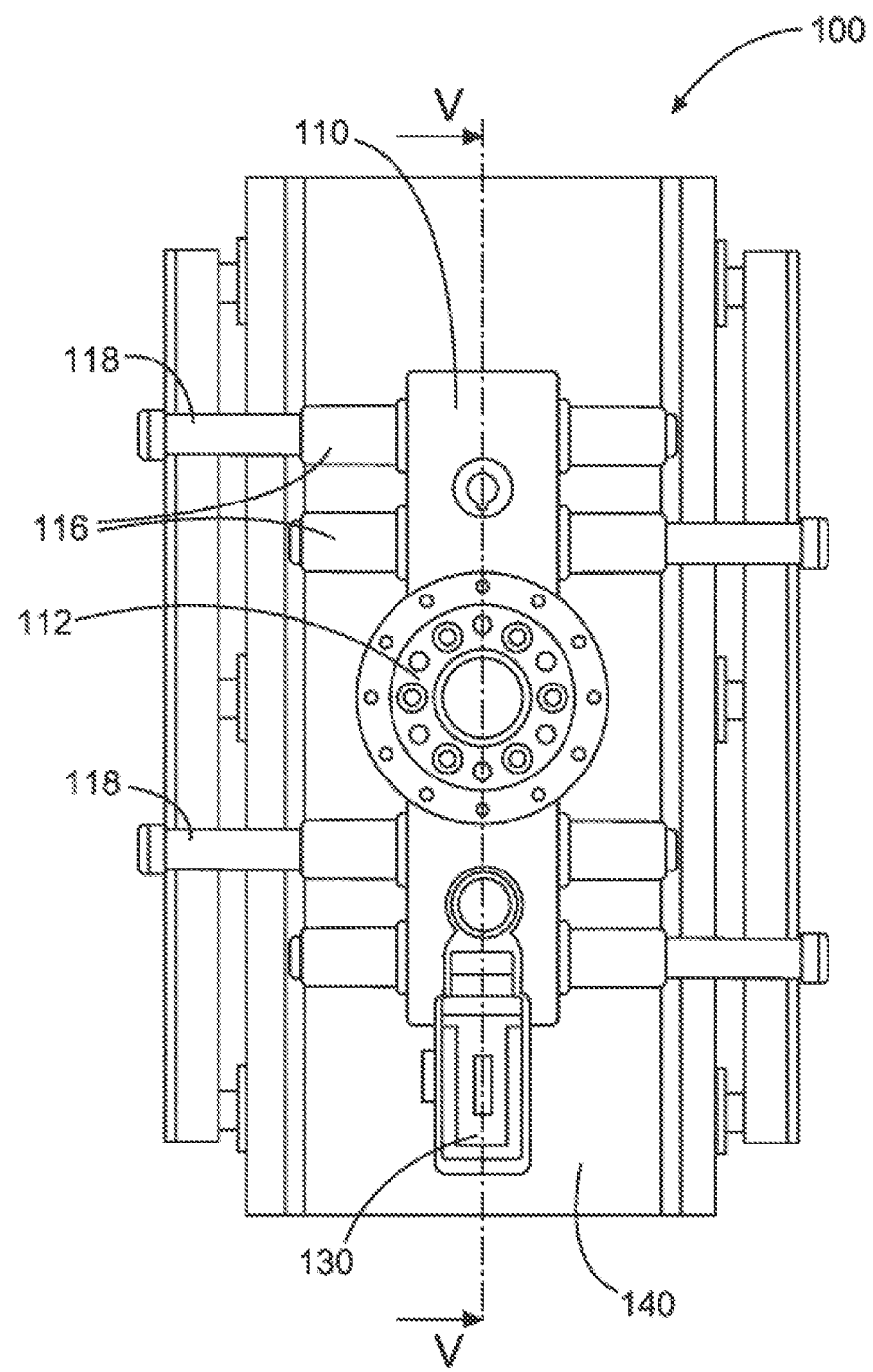
FIG. 4 shows a top view of the gripping device shown in FIG. 1.
Figure 5:
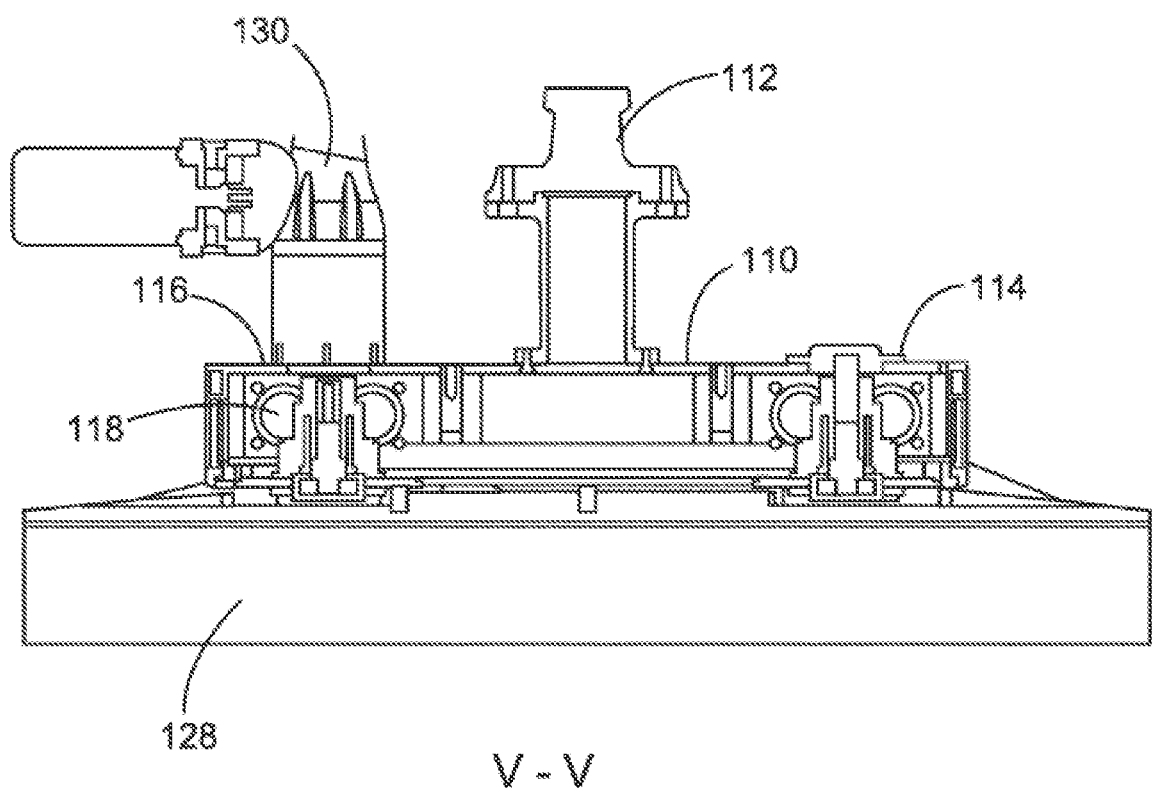
FIG. 5 shows a sectional view, taken along the line V-V in FIG. 4, of the gripping device shown in FIG. 1.

FIGS. 3 to 5 show different views of the gripping device 100 according to the invention. The gripping device 100 is essentially provided with a cuboidal base structure 110, two gripper members 120, drive means 130 for translatorily moving the gripper members 120, and an abutment plate 140.

FIG. 3 shows a perspective view of the gripping device 100. The gripping device 100 consists of an essentially cuboidal, elongated base structure 110 which is preferably made of stainless steel or some other material suitable for contact with foodstuffs and is realised either in the form of solid material or of some material or sheet metal bent into a cuboidal shape, depending on the degree of strain to which the respective component is exposed. Furthermore, the base structure 110 may have a coating that protects the material and/or conveys suitability for contact with foodstuffs to the base structure 110.

The cuboidal base structure 110 has a surface 110a facing towards the end flange E of the robot R, a parallel, opposing surface 110b facing away from the end flange E of the robot R, two opposing lateral surfaces 110c, a front surface and a rear surface 110d, with the two lateral surfaces 110c and the front surface and the rear surface 110d interconnecting the two surfaces 110a and 110b. The front surface 110d and the corresponding opposite rear surface 110d are rectangular, their lengths and widths being at least approximately geometrically similar to each other. In contrast, the two lateral surfaces 110c, the surface 110a facing towards the end flange E, and the surface 110b facing away from the end flange E, of the base structure 110 have a length that is several times longer than the length or width of the front surface or the rear surface 110d of said base structure 110. The length of the surfaces 110a, 110b, 110c of the base structure 110 which extend vertically from the front surface or rear surface 110d depends essentially on the length of the product P to be picked up.

On its side surface facing towards the robot R when it is mounted to said robot R, the base structure 110 is attached to the end flange E of the robot R by means of a coupling element 112 that is fastened to the base structure 110 The coupling element 112 is fastened at the centre of the surface 110a of the base structure 110 which faces toward the end flange E of the robot, said coupling element 112 allowing for removable attachment to the robot R. The coupling element 112 is firmly connected to the base structure 110 and on its free end has an essentially disc-shaped connecting portion which is not otherwise specified and may be detachably connected to the end flange E of the robot R, for example by means of screws.

Four essentially circular or round openings 114 are recessed or incorporated in the lateral surfaces 110c of the base structure 110. As shown in the sectional view of FIG. 5, the openings 114 are arranged centrally with respect to the lateral surfaces 110c of the base structure 110 when considered in a longitudinal direction.

In addition, cylinder extension sockets 116 or guide sleeves are preferably arranged laterally on both sides of the respective end portions of the openings 114, which are disposed in such a manner that they are oriented vertically with respect to the lateral surfaces 110c of the base structure 110 and thus extend the respective axial lengths of the base structure 110. The cylinder extension sockets 116 are oriented in such a manner that they are parallel to the front surface and the rear surface 110d and to the surface 110a facing towards the end flange E and to the surface 110b facing away from the end flange E.

FIG. 4 shows a top view of the gripping device 100. The cylinder extension sockets 116 are arranged in such a manner that four cylinder extension sockets 116 are present on each end portion of the lateral surfaces 110c of the base structure 110. Alternately, two cylinder extension sockets 116 are associated with a respective one of the gripper members 120 and the adjacent cylinder extension sockets 116 are associated with the other gripper member 120.

As may be seen, in particular, from FIG. 5, the cylinder extension sockets 116 are incorporated into the base structure 110 in a manner so as to extend essentially parallel to the surface 110a facing towards the end flange E and to the surface 110b facing away from the end flange E.

Two respective ones of the cylinder extension sockets 116 accommodate a corresponding, cylindrical piston 118 or a guide rod 118 which is respectively movable in axially reversible directions and which advantageously has an axial length that is longer than the axial length between two opposing cylinder extension sockets 116. In the present embodiment, two respective guide rods 118 or four cylinder extension sockets 116 are associated with one gripper member 120.

Figure 6:
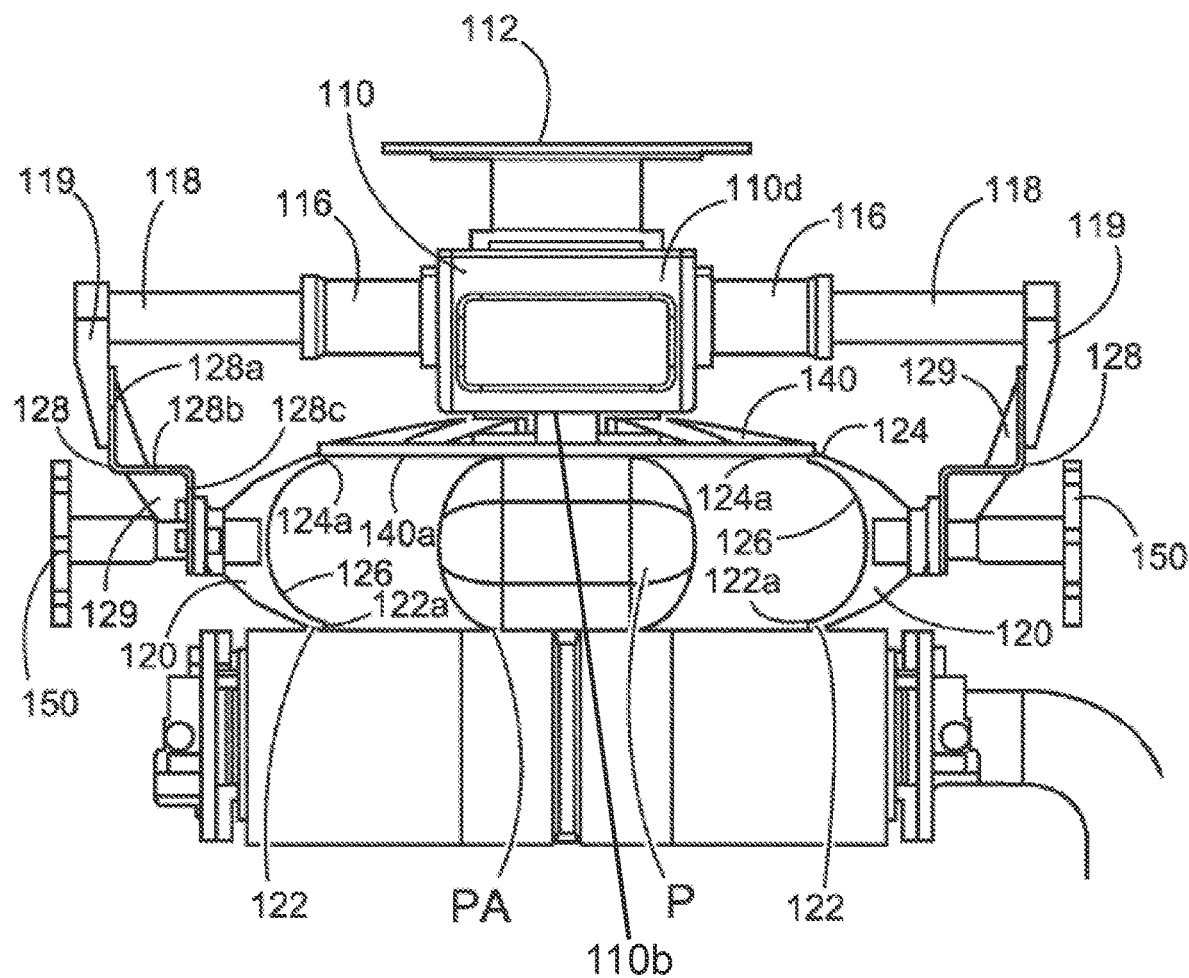
FIG. 6 shows a front view of the gripping device shown in FIG. 1, in an opened condition.
Figure 7:
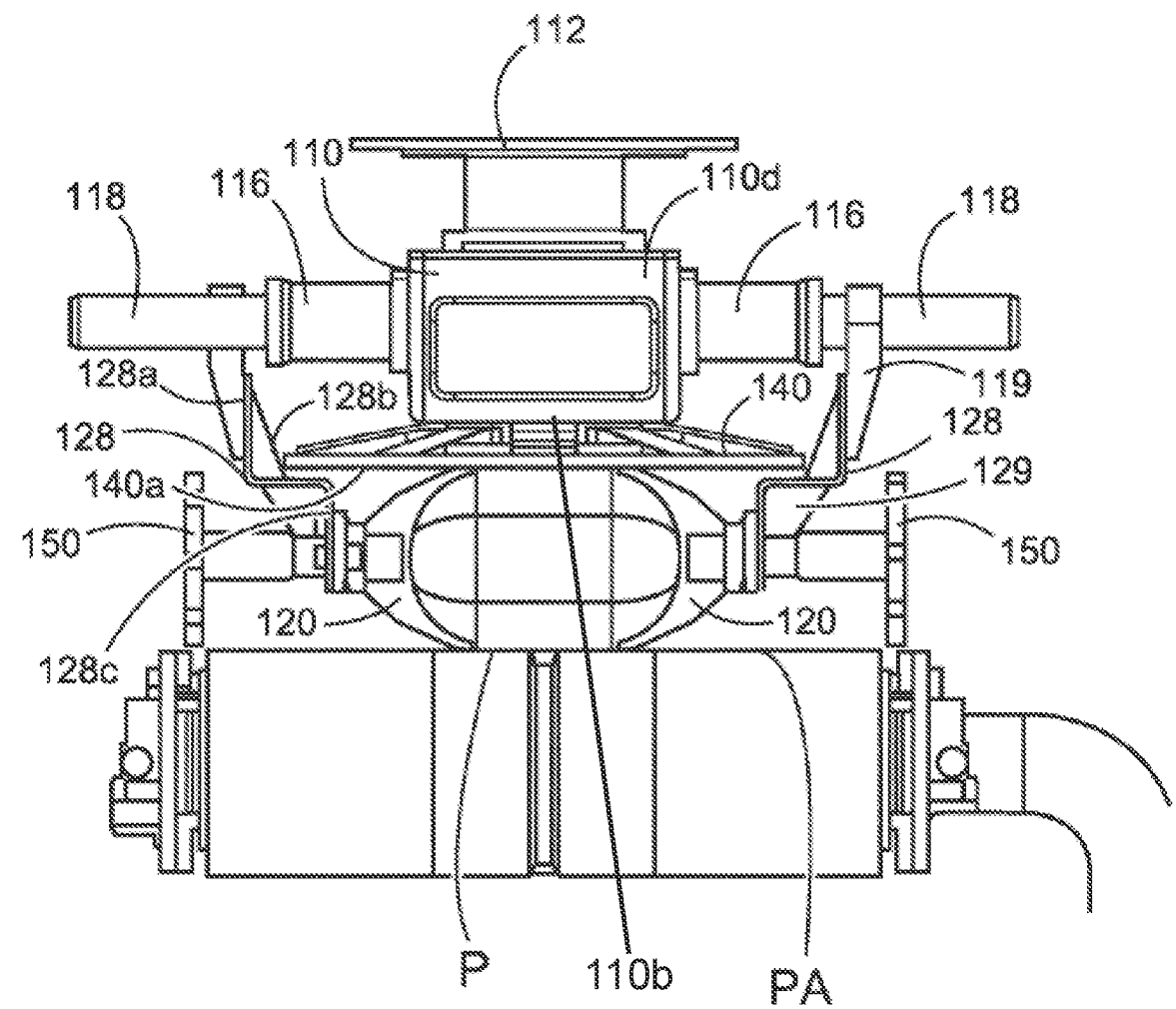
FIG. 7 shows a front view of the gripping device shown in FIG. 1, in a closed condition.

The guide rods 118 serve for reversibly extending and retracting the gripper members 120 of the gripping device 100, as shown in FIGS. 6 and 7 and discussed in greater detail hereinafter. For this purpose, the guide rods 118 are moved to and fro within the cylinder extension sockets 116 using a drive means 130 which will equally be discussed below in greater detail.

The four guide rods 118 are driven by means of a servomotor via a toothing, preferably in the form of a gear rack or a spindle drive. The two guide rods 118 arranged closest to the front surface 110d of the base structure 110 are driven by a drive means 130 and the two guide rods 118 arranged closest to the rear surface 110d of the base structure 110 which are connected to the drive means 130 via a belt drive are equally driven, which causes the guide rods 118 to perform a synchronous movement.

As may be seen from FIGS. 6 and 7, the cylinder extension sockets 116 serve, on the one hand, for guiding the guide rods 118 and, on the other, enable a greater gripper opening width in order to make it possible to seize greater or smaller products P, as the case may be. At the same time, the base structure 110 may be kept small in its spatial dimensions. Adapting the maximum gripper opening width of the gripping device 100 to the width of the product P on the one hand leads to a design of the gripping device 100 that is as compact as possible and, on the other, permits shorter cycle times to be achieved since the gripper members 120 may perform shorter travelling distances when the gripping device 100 is opened or closed.

If the gripper opening width of the gripping device 100 is to be increased, this will necessitate the use of longer guide rod 118. When the gripper members 120 of the gripping device 100 are in an opened position, the extended guide rod 118 will lead to greater lever forces at the exit point of the guide rod 118 (here: at the lateral surfaces 110c of the base structure 110). These may be reduced or attenuated by using cylinder extension sockets 116 which serve to shift the point at which the lever force is applied.

In addition, on the free ends of two respective guide rods 118 belonging to a gripper member 120, a lateral sheet 128 is attached essentially in a vertical manner with respect to the guide rods 118 by means of two connecting elements 119, with the respective free ends of the lateral sheets 128 facing away from the end flange E of the robot R.

The connecting elements 119 have a cylindrical indentation on one end thereof which may be slid onto the guide rods 118 or may, for example, be pressure-bonded therewith or screwed thereon. In order to connect the guide rod 118 to the connecting element 119, other means such as bonding, welding or soldering may also be employed.

The connecting element 119 consists of, for example, stainless steel or of some other type of material suitable for contact with foodstuffs. Furthermore, the connecting element 119 may have a coating that protects the material and/or conveys suitability for contact with foodstuffs to the connecting element.

The connecting element 119 serves for transmitting the linear movement of the guide rods 118 to the lateral sheets 128 that are attached to the free ends of the connecting elements 119. The lateral sheets 128 are preferably welded, soldered, or screwed to the connecting elements 119.

The lateral sheets 128 are formed by a folded sheet bent a number of times, with a first portion 128a, which is firmly connected to the connecting element 119, extending essentially vertically, by reference to FIG. 6, a second portion 128b extending essentially horizontally, and a third portion 128c extending essentially vertically, thus leading to a staircase-like configuration for a lateral sheet 128. The first and third portions 128a, 128c have a greater width than the second portion 128b. A first bending line is situated at approximately one third of the width of the lateral sheet 128 and the second bending line is situated at approximately two thirds of the width of the lateral sheet 128.

In order to ensure sufficient stiffness to the lateral sheet 128 when exposed to a load, the staircase-like lateral sheets 128 are reinforced by cross braces or by laterally extending metal sheets, depending on the type of strain or load experienced. The cross braces 129 or the laterally extending metal sheets are arranged in such a manner as to reinforce the essentially vertically bent portions of the lateral sheets 128.

The two lateral sheets 128 are arranged essentially opposite each other, with the base structure 110 being located partially between the lateral sheets 128. On each of the lateral sheets 128 a respective gripper member 120 is attached with its free end as considered in a longitudinal direction and which is preferably fastened by at least one fastening means 150 that may be detached without tools, such as a locking device or a manually actuatable screw fixing. It goes without saying that it is also possible to use fastening means that may not be detached without tools such as screwing or welding, in order to connect the lateral sheet 128 to the gripper member 120.

In the present embodiment, a plurality of fastening means 150 or screw fixings are disposed in series by means of which the gripper members 120 are fastened at their ends to the lateral sheets 128 which face away from the end flange E of the robot R. Obviously, it is also possible to provide only one fastening means 150 per gripper member 120.

The gripping surfaces 126 of the gripper members 120 have a C-shaped configuration extending essentially in a longitudinal direction, said gripper members 120 being arranged in such a manner that their C-shaped or concave gripping surfaces 126 face towards each other. The gripping surfaces 126 may have smooth as well as undulated or corrugated surface structures which may be provided with longitudinally or transversally extending grooves.

The gripper members 120 consist of, for example, stainless steel, plastic material or of some other type of material suitable for contact with foodstuffs. Furthermore, the gripper members 120 may have a coating that protects the material and/or conveys suitability for contact with foodstuffs to the gripper members 120.

The axial length of the gripper members 120 preferably depends on the length of the product P to be seized. In the present embodiment, the length of the gripper members 120 is slightly greater than that of the product P to be seized, as shown, for example, in FIG. 3.

For enabling a reversibly translatory movement of the gripper members 120 in the direction of the respective opposite gripper member 120, each gripper member 120 has at least one guide rod 118, preferably two guide rods 118, associated therewith which may be actuated pneumatically, servopneumatically, hydraulically or by means of an electric drive mechanism.

Strictly speaking, and as mentioned above, there may be provided only one guide rod 118 and/or only one drive mechanism 130 for moving the gripper members 120. However, due to the length of the gripper members 120, at least four cylinder extension sockets 116 and two guide rods 118 are preferably provided per gripper member 120 since these may serve as a guide to prevent any undesirable torsional movement of the gripper members 120.

By utilising drive means 130 to drive the guide rods 118 within the cylinder extension sockets 116, the gripper members 120 may be reversibly and translatorily moved towards each other from a first, open position in which the gripper members 120 may be positioned on opposite sides of the product P to be picked up and in which preferably they are spaced apart from each other by the greatest possible distance (FIG. 6) to a second, closed position in which the gripper members 120 grip or seize the product P to be picked up (FIG. 7). FIGS. 6 and 7 show the gripping device 100 in an opened and closed position, respectively. The opened and closed positions may be variably adjusted by the drive means 130 or by the servomotor 1130.

The motor, which may be configured, for example, as a servomotor 130, may be coupled to the gripper members 120 in order to control their movements, to adjust a compressive force applicable to the product that is to be pressure-compacted, and/or to convey the product that has been picked up and optionally pressure-compacted by the gripper members 120 to a desired station for further processing such as a meat portioning machine. The servomotor 130 may be configured for providing a compressive force of at least 100 N, at least 500 N, at least 1000 N, at least 1500 N, at least 2000 N, at least 2500 N or at least 3000 N.

The servomotor 130 permits to flexibly react to different product dimensions, thus enabling the gripping device according to the invention to seize and handle products of different dimensions and/or consistencies. The utilisation of the servomotor 130 has proven particularly advantageous with respect to the handling of raw products which need to be seized and further processed in a frozen condition or which have at least started to freeze. On the one hand, the products to be handled have a high weight and on the other, a considerable force is needed for pressure-compacting the frozen product, or the product that has started to freeze, into a desired shape, which force may be readily provided and/or adjusted by means of the motor. Obviously, handling of non-frozen raw products, or raw products that have not yet started to freeze, is equally possible.

The guide rods 118 which move within the cylinder extension socket 116 transmit their linear movement to the connecting elements 119, to the lateral sheets 128 and, consequently, to the gripper members 120 attached thereon. Advantageously, the gripper members 120 act in parallel, i. e. the gripper members 120 move towards each other and away from each other in synchronism as they open and close. It goes without saying that the gripper members 120 may also be actuated sequentially, or only one gripper member 120 is reversibly moved towards the other gripper member 120 which, in this case, is preferably stationary.

The gripper members 120 have respectively a bottom surface 122 and a top surface 124, with the top surfaces 124 of the gripper members 120 facing towards the base structure 110 of the gripping device 100 and the bottom surfaces 122 of the gripper members 120 facing away from the base structure 110 of the gripping device 100.

The gripper members 120 may, for example, have a cup-like shape and/or may be concavely curved. Furthermore, the top surfaces 124 and the bottom surfaces 122 of the gripper members 120 may be integrally formed from a single piece of material. According to the exemplary embodiments depicted in the figures, the gripper members 120 reach only partially under the picked-up product, thus ensuring continuous contact between the product and the product support PA. In a further exemplary embodiment, the gripper members 120 have an L-shaped structure when considered in cross-section. The top surfaces 124 may extend in a rectilinear manner. Furthermore, the bottom surfaces 122 may equally be rectilinear in certain sections thereof, with a side adjoining the respective top surface 124 extending parallel to the lateral surface areas and/or a bottom-facing side to be applied to the product support PA being oriented essentially normally with respect to the other side. The dimensioning of the bottom-facing side may be greater than the dimensioning of the other side and, possibly, that of the top surface 124.

The abutment plate 140 is realised, on at least a side facing the gripper members 120, in particular the bottom side, in an essentially flat and/or planar manner (cf. FIG. 6 and FIG. 7). The abutment plate 140 may serve for preventing the product to be picked up by the gripper members 120 from slipping away laterally upwards while the product is being seized by the gripper members 120. As may be seen from FIG. 6 and FIG. 7, when viewed together, the abutment plate 140 is configured to be supported by the top surfaces 124 of the gripper members both in the opened condition of the gripper members 120 (FIG. 6) and in the closed position (FIG. 7). The abutment plate 140 is dimensioned in such a manner and/or one dimension of the abutment plate 140 is adapted to a maximum horizontal distance of the gripper members 120 with respect to each other or to an movement amplitude of said gripper members 120, such that the abutment plate 140 is supported by the top surfaces 124 of the gripper members 120 both in the first and in the second position.

The at least one drive means 130 is arranged on the side of the base structure 110 facing towards the end flange E at the centre between two adjacent guide rods 118 which are located between respective coupling elements 112, as shown in FIG. 4. The drive means 130 is guided to the guide rods 118 that need to be driven via an opening provided in the surface of the base structure 110 that faces towards the end flange E.

The guide rods 118 are preferably driven by means of a servomotor and gear racks. Alternatively, the guide rod 118 may be realised itself as a gear rack. Furthermore, the guide rods 118 may optionally be driven by a threaded spindle, a ball screw or a metric threaded spindle instead of a gear rack. In addition, a crank gear may be used instead of the gear rack for driving the gripper members 120.

In the present embodiment, one drive mechanism 130 is sufficient in order to move the gripper members 120, with two guide rods 118 being driven by the drive mechanism 130, while the other two guide rods 118 are connected to the driven guide rods 118 via a toothed-belt drive and are therefore equally driven. In some embodiments, however, two drive means 130 may be provided, with each drive means 130 driving two guide rod 118, respectively. As may be seen from FIG. 4, an opening for accommodating said second drive means 130 has been provided in the surface 110a of the base structure 110 facing towards the end flange E of the robot.

Moreover, in a further embodiment, a coupling element may be provided which connects two guide rods 118 which belong to one gripper member 120, respectively. In this manner, two guide rods 118 belonging together may be activated by one drive means 130.

The essentially rectangular abutment plate 140 is attached to the surface 110b of the base structure 110 facing away from the end flange E. The abutment plate 140 has a width corresponding at least to the maximum opening width of the gripper members 120 and a length preferably corresponding to the axial length of the gripper members 120. The abutment plate 140 is arranged in such a manner that it is supported in an at least approximately planar manner by the top surfaces 124 of the gripper members 120.

The gripper members 120 as well as the abutment plate 140 are manufactures of POM Food, stainless steel or plastic material, with other materials suitable for contact with foodstuffs being equally possible, which, in addition, are capable of resisting the loads encountered during the gripping process. Furthermore, the gripper members 120 and the abutment plate 140 may have a coating that protects the material and/or conveys suitability for contact with foodstuffs to the base structure 110.

The edges 122a, 124a and/or the top surface and the bottom surface 122, 124 of the gripper members 120 are advantageously rounded in order to reduce friction between the product support PA and the abutment plate 140. In addition, the gripper members 120 may be coated either all over or partially on their edges 122a, 124a and on the top surface and bottom surface 122, 124, with the coating acting to reduce friction.

Advantageously, the lateral sheets 128 on which the gripper members 120 are attached are bent in such a manner that on the one hand, they do not collide with the abutment plate 140 and, on the other, allow the product P to be safely seized.

As explained further above, the lateral sheets 128 have a staircase-shaped configuration, with the lateral sheets 128 being cost-efficient and allowing easy fabrication, for example by using a bending machine.

In addition, the drive means 130 of the guide rods 118 is capable of pressure-compacting the product P which has been picked up by the gripper members 120. The pressure-compacting is carried out essentially from the sides, with the product P being compressed into a predefined shape. In addition, the term pressure-compacting is to be understood in such a manner that the product P is compressed more than what is required to ensure a suitable retention force. The product P is compressed into a predefined shape such that it may subsequently be inserted into an essentially upright chute or into a form tube or magazine tube.

On the one hand, the product P may be pressure-compacted while being conveyed by means of the handling device R. The abutment plate 140 serves for preventing the product P from slipping away laterally in an upward direction during the process of pressure-compacting.

On the other hand, the product P may be pressure-compacted on the product support PA. The product support PA is, for example, a conveying device such as a conveyor belt or another kind of transporting device. In addition, the product support PA advantageously ensures that the product P that is to be pressure-compacted cannot slip away laterally in a downward direction. The process of pressure-compacting may be carried out either directly upon gripping of the product P or during the movement of the handling device R.

In a further embodiment, the gripper members 120 are translatorily and/or rotatorily movable. For example, the connecting elements 119 which are arranged between the guide rods 118 and the lateral sheets 128 may be possible pivot points for the rotatory movement of a gripper member 120, thus enabling both translatory and rotatory movement of the gripper members 120. A purely rotatorily movable gripping device 100 may, for example, be realised by a scissor-like design of the gripper members 120.

Figure 8:
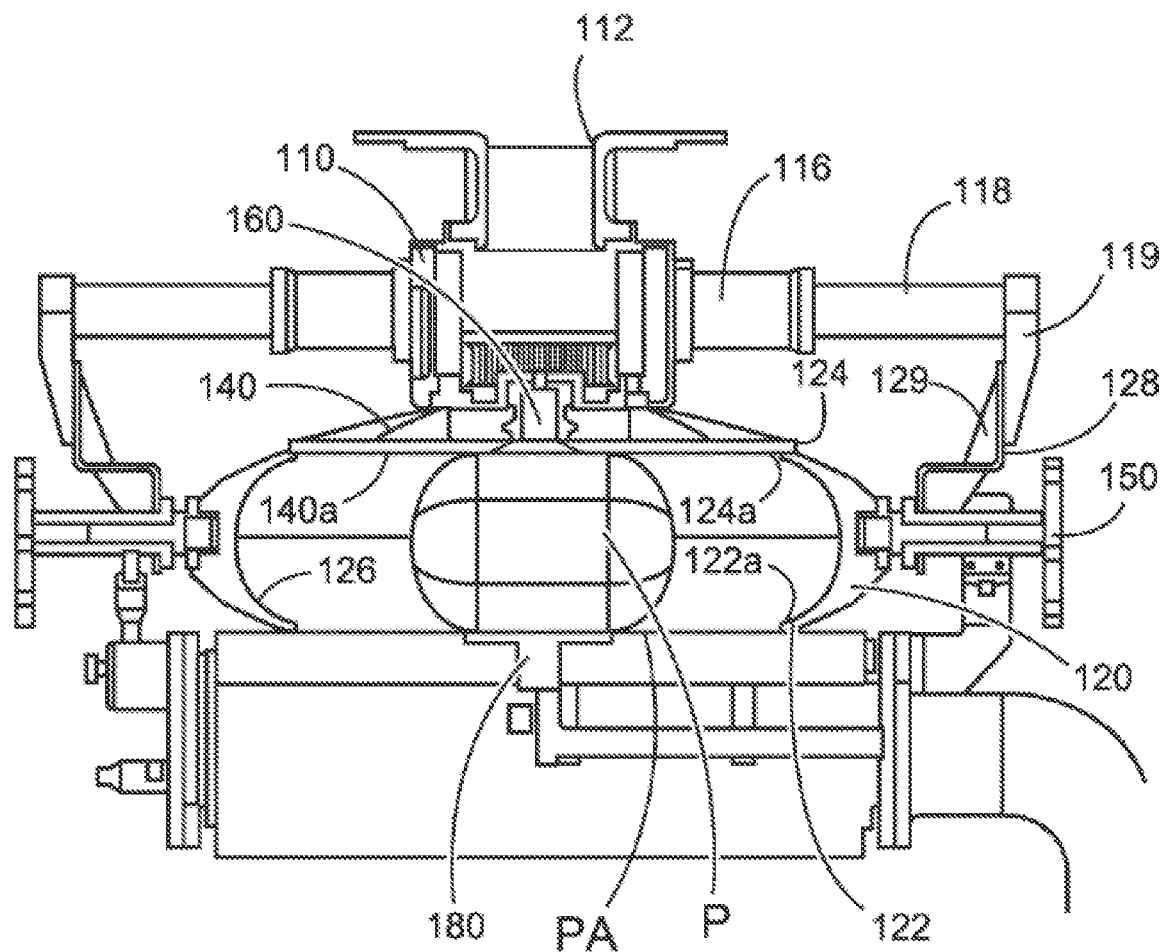
FIG. 8 shows a front view of a gripping device in an opened condition, according to a further embodiment of the present invention.

FIG. 8 shows a further embodiment of a gripping device 100 of the present invention in which at least one suction element 160 is arranged on the surface 140a of the abutment plate 140 which faces away from the end flange E of the robot R. Preferably, the at least one suction element 160 is arranged centrally or laterally on the abutment plate 140 or recessed therein. Depending on the length of the product P, several suction elements 160 may be required which are arranged centrally in a row along a longitudinal direction on the abutment plate 140.

The suction elements 160 are configured to be capable of at least partially lifting the product P to be picked up from its support surface PA which may be, for example, a conveyor belt. The suction elements 160 are preferably recessed into the abutment plate 140 in such a manner as to form an at least approximately even surface with the surface 140a of the abutment plate 140 which faces away from the end flange E of the robot R during the suction process.

In addition, FIG. 8 shows an elongate lifter 180 which is arranged below the product support PA. In the following, the lifter 180 may be understood as a system, with the lifter 180 capable of being employed or activated independently of the presence of the suction element 160 and the robot R.

Preferably, the lifter 180 has a T-shaped configuration when considered in a longitudinal direction, with the lifter 180 preferably having approximately the length of the product P to be picked up.

The elongate lifter 180 is arranged below the product support PA, which is preferably a transport belt, in such a manner that it is located at least temporarily and essentially in its entirety below the product P.

The lifter 180 is capable of lifting the product P and product support PA, which serves for making it easier for the gripper members 120 to be slid under the product P and thus to reach under the latter. In addition, the product support PA will not be damaged in the course of the gripping operation since the gripper members 120 are not supported by the product support PA. The lifter 180 may, for example, be activated pneumatically, electrically, or hydraulically.

Furthermore, the lifter 180 may be activated independently of the robot R and/or may be triggered by means of a trigger mechanism such as a light barrier. The trigger mechanism is positioned such that it is triggered by the product P at the point at which the product P is to be seized or shortly afterwards.

Optionally, at least one detection means 170 may be additionally arranged on the abutment plate 140 which senses or detects whether the product P is applied on the abutment plate 140 and/or whether the suction element 160 has sucked the product P or whether the lifter 180 has lifted the product P. The detection means 170 may, for example, be a pressure switch or a sensor (not shown) which is at least partially recessed into the abutment plate 140.

Figure 9:
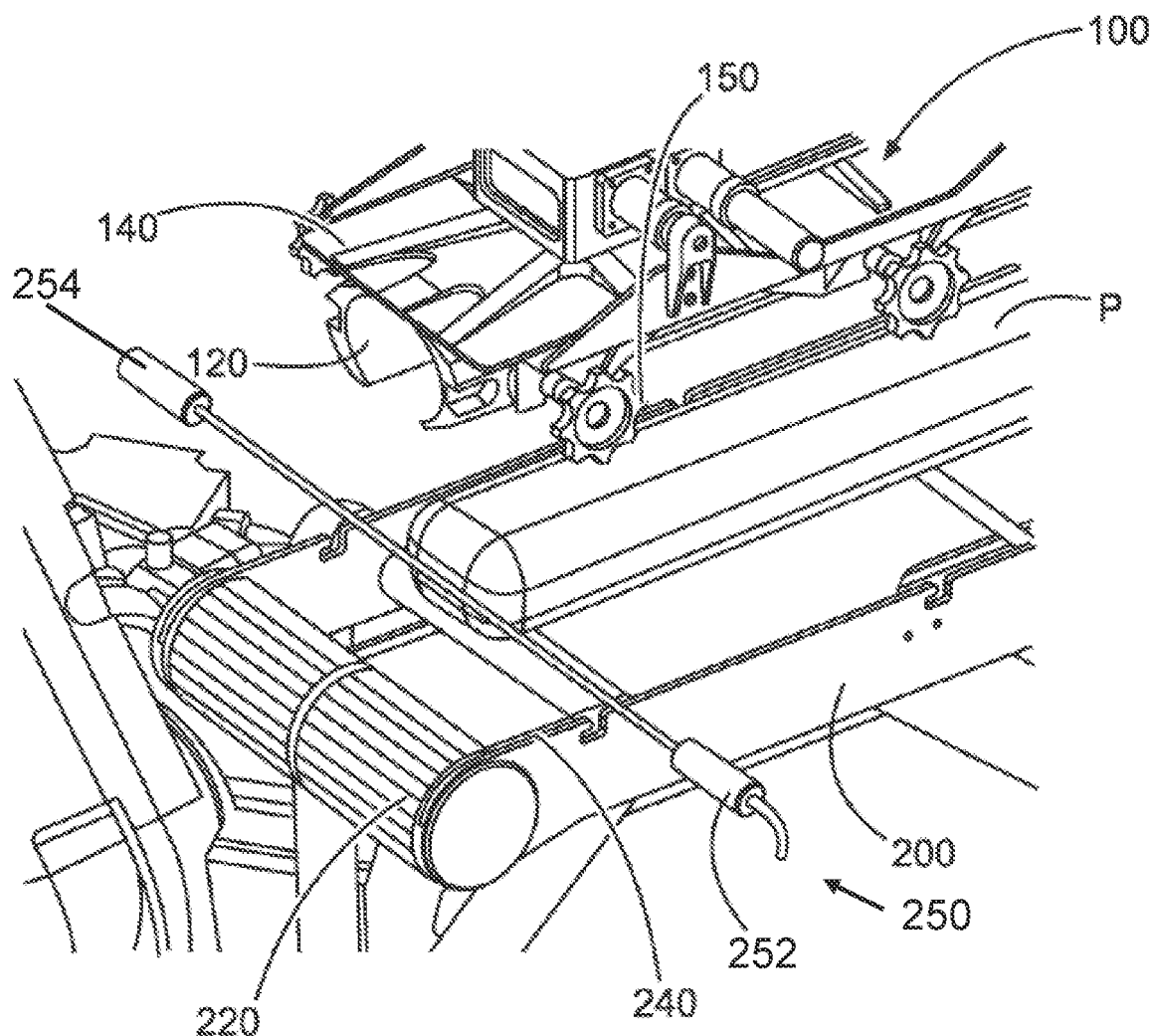
FIG. 9 shows a perspective partial view of the system shown in FIG. 1 having a first detection means for detecting a pick-up position of a product to be handled on a transporting apparatus according to one embodiment of the present invention.

Moreover, as shown in FIG. 9, the system has a first detection means 250 such as a light barrier 250 which is capable of detecting the presence of a product P as soon as it is placed in a pick-up position A on the transporting apparatus 200 or on the endless conveyor 200. In the present embodiment, the light barrier 250 is arranged laterally on the endless conveyor 200.

A light barrier 250 essentially consists of a light beam source 252 which forms the emitter 252 and a sensor 254 which forms the receiver 254 of the light beams. The emitter 252 and the receiver 254 of the light barrier 250 are arranged essentially vertically with respect to the direction of movement X of the conveyor belt 200. Furthermore, the light barrier 250 at a given height above the product support PA of the endless conveyor belt 240 which is selected in a manner so as to be smaller than the height or the width of the product to be picked up. The height of the light barrier 250 may be adjusted depending on the nature and on the height of the product P to be picked up.

The transporting apparatus 200 or the endless conveyor 200 transports the product P to be picked up along the direction of movement X of the conveyor belt 200. When the product P contacts the light beam of the light barrier 250, it thus triggers a signal informing the robot R to pick up the product P. In addition, the endless conveyor 200 may optionally be automatically stopped, as the product passes the light beam 250, and kept stationary until the light barrier 250 no longer detects an object such as the product P or the gripper members 120.

The first detection means 250 is not limited to a light barrier 250 but may rather include a plurality of possibilities to detect the presence of a product P in a predefined position on a product support PA, such as by means of a capacitive sensor, a mechanical sensor or an imaging sensor. Furthermore, the disposition of the first detection means 250 is not limited to a given orientation by reference to the transporting apparatus 200. A disposition of, for example, an imaging sensor above, or obliquely above, the transporting apparatus 200 is equally possible.

So when the light barrier 250 triggers a signal detecting that the product P is located in the pick-up position A, the robot R will move the gripping device 100 to said pick-up position A and seizes the product P to be picked up, either during the operating motion of the conveyor belt 200 or while the latter is stationary.

Figure 10:
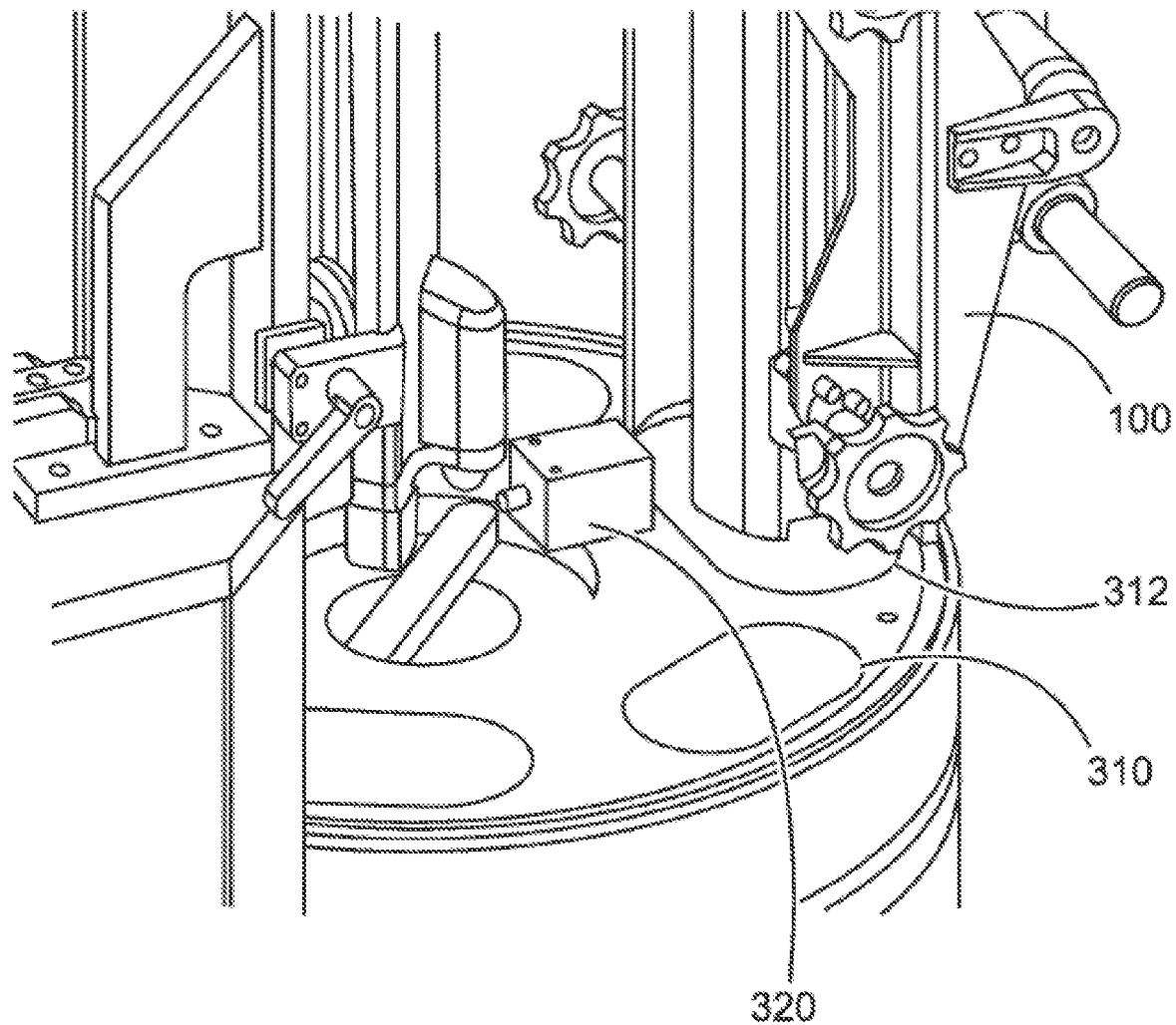
FIG. 10 shows a perspective partial view of the system shown in FIG. 1 having a second detection means for detecting a product to be handled which is in a delivery position, according to one embodiment of the present invention.

FIG. 10 shows a perspective view of portion of the gripping device 100 and of the portioning machine 300. The portioning machine 300 has a delivery position B at which the product P is to be delivered. As far as the portioning machine 300 is concerned, it has one or several magazine tubes 310, as they are referred to, one of which being the delivery magazine tube 312 into which the product P is to be ejected. The magazine tube 310 or the delivery magazine tube 312 preferably has an essentially round or oval opening.

In the present embodiment, the delivery position B of the gripping device 100 is located directly above the delivery magazine tube 312, with the delivery position B being preferably located 10 mm above the delivery magazine tube 312. Accordingly, the gripping device is positioned such that the gripper members 120 are vertically in alignment with the delivery magazine tube 312, thus enabling the product P to fall longitudinally into the delivery magazine tube 312 once the gripping device 100 has been opened.

Depending on circumstances, the distance between the gripping device 100 and the delivery magazine tube 312 may be varied in order to ensure that the product P will fall into the delivery magazine tube 312.

The portioning machine 300 has a second detection means 320 such as a capacitive sensor 320 arranged thereon which is arranged, for example, above or on the magazine tube 310. The capacitive sensor 320 is oriented such that it detects a product P which is located in a delivery position B within the gripping device 100. If the capacitive sensor 320 detects the presence of a product P, it transmits a signal which serves for opening the gripper members 120 of the gripping device 100, such that the product P falls or slides into the delivery magazine tube 312.

Figure 11:
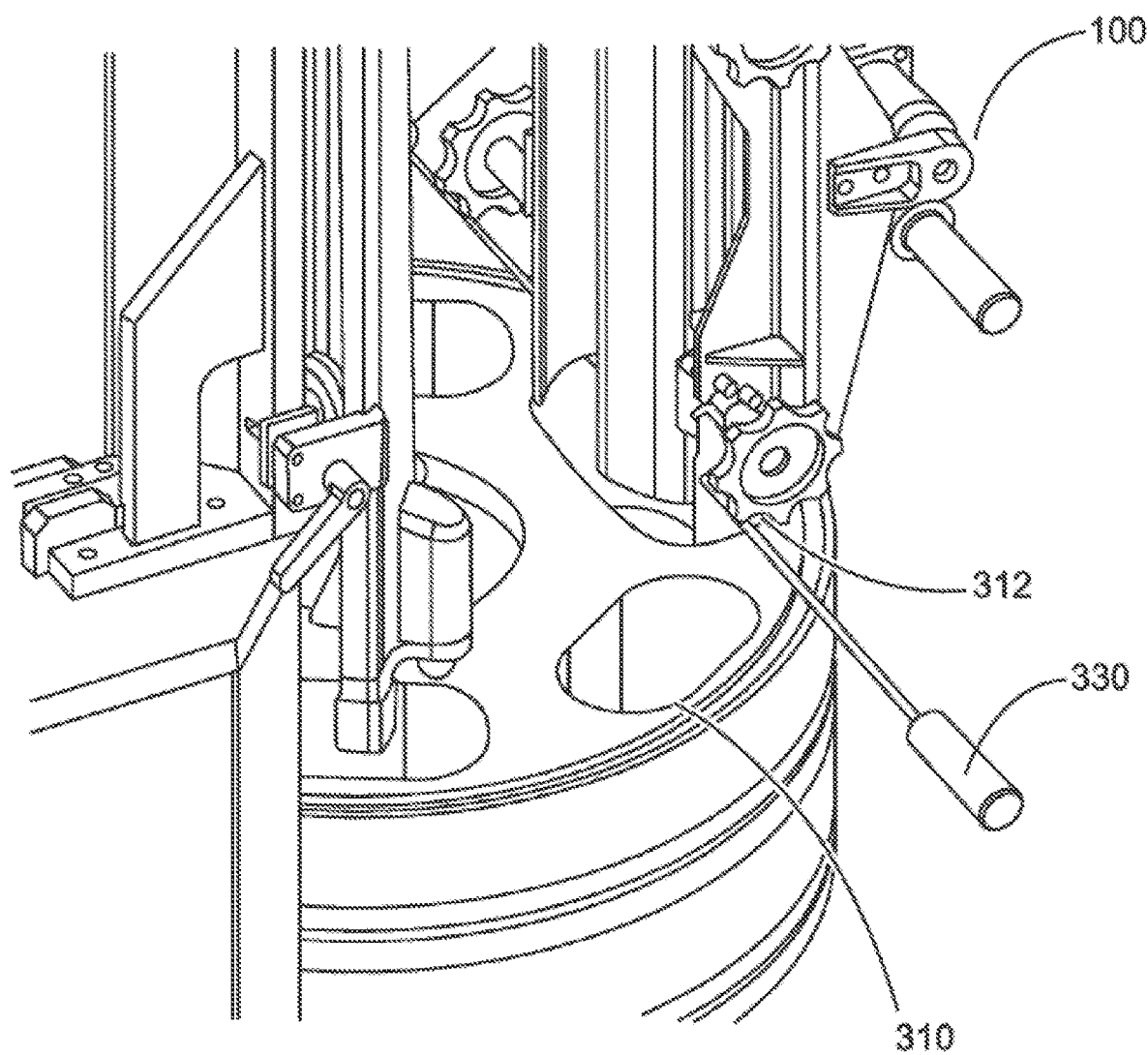
FIG. 11 shows a perspective partial view of the system shown in FIG. 1 having a third detection means for detecting a product to be handled located between a gripping device and a delivery magazine tube, according to one embodiment of the present invention.
Figure 12:
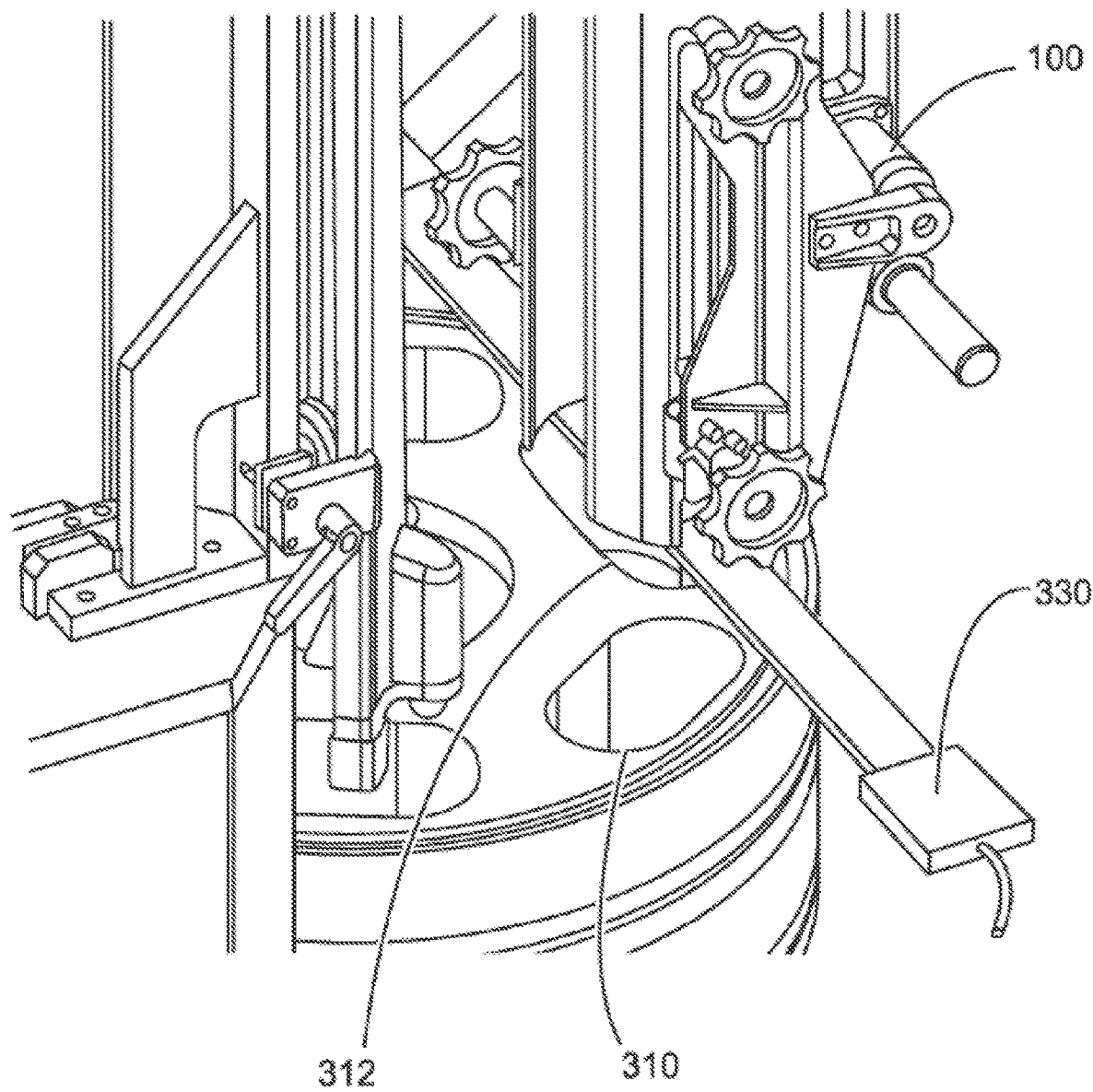
FIG. 12 shows a perspective partial view of the system shown in FIG. 1 having a third detection means for detecting a product to be handled located between a gripping device and a delivery magazine tube, according to a further embodiment of the present invention.

The portioning machine 300 has a third detection means 330 such as a light barrier or a light curtain provided thereon, as shown in FIGS. 11 and 12, which is arranged in such a manner that, when the gripping device 100 is located in the delivery position B, that it detects the presence of a product P between the gripping device 100 and the delivery magazine tube 312.

The third detection means 330 serves for ensuring that the product P has been fully delivered to the delivery magazine tube 312. Again, a wide variety of sensors may be employed for this purpose such as a light barrier, as described above in connection with FIG. 9, a light grid, a light barrier, a capacitive sensor, a mechanical sensor or an imaging sensor.

As the gripping device 100 opens its gripper members 120, the product P located between the gripper members 120 falls into the delivery magazine tube 312. The third detection means 330 first detects that a product P is located between the gripping device 100 and the delivery magazine tube 312 and subsequently, or concurrently, measures how long it takes for the product P to be fully delivered to the delivery magazine tube 312. For this purpose, the detection means 330 checks whether the product P has been delivered to the delivery magazine tube 312 within a predefined ejection time ranging preferably between 0.05 s and 1 s.

If the ejection time stretches beyond the predefined time period, the third detection means 330 outputs an error message which causing the system to shut down or to switch to an idle state which needs to be manually reset by an operator.

The first, second, and third detection means 250, 320, 330 may be employed independently of one another. This is to say that the first detection means 250 and/or the second detection means 320 and/or the third detection means 330 may be provided in the system.

As explained further above, the detection means 250, 320, 330 are not limited to certain sensors but may rather include a plurality of possibilities to detect the presence of a product P, such as by means of a capacitive sensor, a mechanical sensor or an imaging sensor. Furthermore, the disposition of the detection means 250, 320, 330 is not limited to a given orientation. A disposition of, for example, an imaging sensor above, obliquely above or beside the system is equally possible.

The following provides a description of a method of controlling a system for picking up, conveying, and delivering a product P which includes a handling device R, a gripping device 100 removably attachable to the handling device R, a transporting apparatus 200, and a control unit 400. First, the presence of a product P to be picked up on a product support PA is detected, which detection is performed, for example, by a first detection means 250 such as a light barrier. The first detection means 250 transmits a signal to the robot R which subsequently positions the opened gripper members 120 of the gripping device 100 in a first position in which the gripper members 120 are positioned on opposite sides of the product P to be picked up. As soon as the first position is reached, the robot R uses the gripping device and seizes the product P to be picked up in that at least one of the gripper members 120 reversibly moves in the direction of the product P until a second position is reached in which the product P has been seized by the gripping device 100. Subsequently, the product P is pressure-compacted or compressed or compressed using a predefined force so as to assume a predefined shape, which is carried out by means of the gripper members 120 and the abutment plate 140 and, optionally, the product support PA. Subsequently, the robot R, together with the gripping device 100 and the picked-up product P, travels to a predefined position in which a second detection means 320 checks whether the product P is located within the gripping device 100. Then the gripper members 120 of the gripping device are opened and the product P is delivered to a magazine tube, the ejection time being monitored by a third detection means 330.

On the one hand, the product P may be pressure-compacted into a predefined shape by means of the gripper members 120, the abutment plate 140, and the product support PA directly while placed on said product support PA. On the other, the product P may be pressure-compacted into a predefined shape by means of the gripper members 120 and the abutment plate 140 while in the process of being conveyed, which makes it possible to additionally reduce the cycle time, since the conveying operation and the pressure-compacting operation are performed simultaneously.

REFERENCE SIGNS

A pick-up position
B delivery position
R handling device
E end flange
F foundation plate
P product
PA product support
X direction of movement
100 gripping device
110 base structure
110*a* a surface of the base structure facing towards the end flange of the robot
110*b* a surface of the base structure facing away from the end flange of the robot
110*c* lateral surfaces of the base structure
110*d* front and rear surfaces of the base structure
112 coupling element
114 openings
116 cylinder extension socket
118 piston
119 connecting element
120 gripping member
122 bottom surface
122*a* edge
124 top surface
124*a* edge
126 gripping surfaces
128 lateral sheet
128*a* first portion of the lateral sheet
128*b* second portion of the lateral sheet
128*c* third portion of the lateral sheet
129 cross braces
130 drive means
140 abutment plate
140*a* side of the abutment plate facing away from the end flange of the robot
150 fastening means
160 suction element
180 lifter
200 transporting apparatus
220 deflection pulley
240 endless conveyor belt
250 first detection means
252 sender
254 receiver
300 processing machine
310 magazine tube
320 second detection means
330 third detection means
400 control unit

The invention claimed is:

1. A system comprising:
a foodstuff portioning machine which has at least one magazine tube;
a transporting apparatus for conveying a strand-like foodstuff product;
a gripping device for picking up the foodstuff product from the transporting apparatus and for delivering the foodstuff product to the magazine tube;
a handling device on which the gripping device may be detachably fastened;
wherein the transporting apparatus further has a transporting portion on which the foodstuff product to be picked up by the gripping device may be positioned in a pick-up position so that the foodstuff product may be picked up by the gripping device, and
a control unit is connected at least to the handling device, the gripping device (100), and the transporting apparatus;

wherein the control unit is configured to detect when the foodstuff product to be picked up has reached the pick-up position.

2. The system as claimed in claim 1, further comprising:
a first detection means which is arranged above the transporting apparatus;
wherein the first detection means is configured to detect when the foodstuff product to be picked up has reached the pick-up position on the transporting apparatus.

3. The system as claimed in claim 1, further including:
a second detection means;
wherein the gripping device may be positioned in a delivery position above the at least one magazine tube for delivering the foodstuff product which has been picked up by the gripping device to the magazine tube; and
the second detection means is configured for detecting the presence of the foodstuff product which has been positioned above the magazine tube by the gripping device.

4. The system as claimed in claim 1, further including:
a third detection means which is arranged above the at least one magazine tube of the processing machine;
wherein the third detection means is configured to detect a foodstuff product falling into the magazine tube.

5. The system as claimed in claim 1,
wherein the gripping device includes:
a base structure which may be attached to a handling device by means of a coupling element, preferably so in a non-destructively detachable manner;
at least two gripper members having each at least one bottom surface and at least one top surface,
wherein the top surfaces of the gripper members face towards the coupling elements and the bottom surfaces of the gripper members face away from the coupling elements;
at least one drive means in order to reversibly move the gripper members between a first position, in which the gripper members may be positioned on opposite sides of the foodstuff product to be picked up, and a second position, in which the gripper members seize the foodstuff product to be picked up; and
an abutment plate which is supported at least approximately by the top surfaces of the gripper members.

6. The system as claimed in claim 5,
wherein the gripper members of the gripping device are provided with concave gripping surfaces which are capable of reaching at least partially under the foodstuff product to be picked up.

7. The system as claimed in claim 5,
wherein at least one of the gripper members is translatorily and/or rotatorily movable with respect to the base structure.

8. The system as claimed in claim 5,
wherein the gripper members are fastened to the gripping device by fastening means that may be detached without tools.

9. The system as claimed in claim 5,
wherein at least one suction element is arranged on the abutment plate which lifts the foodstuff product to be picked up at least partially during a suction process.

10. The system as claimed in claim 9,
wherein the suction element is recessed into the abutment plate in such a manner as to form an at least approximately even surface with said abutment plate during the suction process.

11. The system as claimed in claim 5,
wherein each of the gripper members is guided by at least two guide rods.

12. The system as claimed in claim 5,
wherein the gripper members of the gripping device are capable of pressure-compacting the foodstuff product into a predefined shape.

13. The system as claimed in claim 5,
wherein the abutment plate has a detection means arranged thereon which is capable of detecting the presence of the foodstuff product.

14. The system as claimed in claim 1,
wherein the transporting apparatus has an endless conveyor which includes at least two deflection pulleys and an endless conveyor belt,
wherein on a product-conveying portion of the transport belt, the foodstuff product to be picked up by the gripping device is conveyed in a direction of movement X.

15. A method of controlling a system for picking up, conveying, and delivering a strand-like foodstuff product to a foodstuff portioning machine which has at least one magazine tube, said method including the steps of:
detecting a presence of the foodstuff product to be picked up on a foodstuff product support of a transporting apparatus;
positioning gripper members of a gripping device in a first position in which the gripper members are positioned on opposite sides of the foodstuff product to be picked up;
seizing the foodstuff product to be picked up in that at least one of the gripper members reversibly moves in a direction towards the foodstuff product until a second position is reached;
compressing the foodstuff product,
wherein the foodstuff product is pressure-compacted into a predefined shape by means of the gripper members and an abutment plate and, optionally, the foodstuff product support;
moving the gripping device together with the foodstuff product to a predefined position; and
delivering the foodstuff product to the magazine tube of the foodstuff portioning machine.

16. The method of controlling a system as claimed in claim 15,
wherein the foodstuff product placed on the foodstuff product support of the transport belt is pressure-compacted into a predefined shape by means of the gripper members, the abutment plate, and the foodstuff product support.

17. The method of controlling a system as claimed in claim 15,
wherein the foodstuff product is pressure-compacted into a predefined shape by means of the gripper members and the abutment plate during the process of being conveyed.

18. The method of controlling a system as claimed in claim 15,
wherein a second detection means is provided, which detects the presence of the foodstuff product within the gripping device while the latter is in its predefined position above the magazine tube.

19. The method of controlling a system as claimed in claim 15,
wherein a third detection means is provided which detects an ejection time,
wherein the ejection time corresponds to a period of time that begins essentially with the delivery of the foodstuff product to the magazine tube by the gripping device, and ends as soon as the placement of the foodstuff product within the magazine tube has essentially been accomplished.

\* \* \* \* \*